United States Patent [19]

Hawes

[11] 4,192,091
[45] Mar. 11, 1980

[54] PHOTOGRAPHIC DISPLAY APPARATUS AND METHOD

[76] Inventor: Michael Hawes, P.O. Box 1282, Topanga Canyon, Calif. 90290

[21] Appl. No.: 931,197

[22] Filed: Aug. 4, 1978

[51] Int. Cl.$^2$ ............................................. G09F 19/16
[52] U.S. Cl. ...................................... 40/615; 355/77
[58] Field of Search .................. 40/615, 616, 219, 582; 355/77

[56] References Cited

U.S. PATENT DOCUMENTS

| | | | |
|---|---|---|---|
| 1,627,468 | 5/1927 | Stitt | 40/615 |
| 2,116,471 | 5/1938 | Nelson | 40/615 |
| 2,500,511 | 3/1950 | Bonnett | 40/582 |
| 3,599,359 | 8/1971 | Michael | 40/615 |
| 3,997,991 | 12/1976 | Hayman-Chaffey et al. | 40/615 |

FOREIGN PATENT DOCUMENTS

| | | | |
|---|---|---|---|
| 15409 | of 1899 | United Kingdom | 40/615 |
| 311836 | 5/1929 | United Kingdom | 40/615 |
| 968288 | 9/1964 | United Kingdom | 40/615 |

*Primary Examiner*—John W. Shepperd
*Attorney, Agent, or Firm*—Romney, Schaap, Golant, Disner & Ashen

[57] ABSTRACT

A photographic display apparatus which comprises a substrate, as for example, a glass sheet having a mirrored surface thereon. An orthochromatic, high contrast, graphic arts copy film, or so-called "ortho film," having a positive visual image is disposed on the substrate and is covered by a transparent sheet. These three components may then be secured together by conventional means. The image on the ortho film is viewed through the transparent sheet against the mirrored surface of the substrate and which presents a unique visual appearance, similar to that of an image etched onto glass. The ortho film may be made by using a positive print of the desired image and generating a negative film therefrom through conventional photographic techniques. This negative film may be printed and enlarged if desired during the printing process in order to produce a positive ortho film sheet which is used in the above photographic display apparatus.

13 Claims, 2 Drawing Figures

PHOTOGRAPHIC DISPLAY APPARATUS AND METHOD

BACKGROUND OF THE INVENTION

1. Field of the Invention

This invention relates in general to certain new and useful improvements in photographic display apparatus and, more particularly, to photographic display apparatus which utilize an orthochromatic, high contrast, graphic arts copy film containing an image thereon viewed against a mirror background.

2. Brief Description of the Prior Art

In recent years, images etched onto glass or otherwise formed in glass by conventional techniques have become somewhat popular. Generally, the images may be etched onto the glass and then silver-coated. The techniques for producing these etched glass images are well known and are not described in detail herein. However, the process of producing the etched glass images in somewhat time-consuming and hence expensive, at least in terms of costly labor time.

There has been one prior art technique for producing a pattern on the back of a glass sheet and which pattern is made by spraying a silver coating on the glass sheet in accordance with the prominent outlines of a photographic image to be presented. Thereafter, the photograph of this image is placed in registry with the sprayed silver pattern to produce a somewhat unique effect of an etched glass image. However, in this case, the photograph can be a color photograph so that the resulting image is presented in color, although in the form of an etched glass image.

There has been another prior art technique of silk screening an image on the back surface of a glass sheet, and thereafter spraying a silver coating around the prominent portions of the image. Then, the entire back surface of the glass sheet is silvered so that when one looks through the glass sheet, the resulting appearance is somewhat similar to that of etched glass.

OBJECTS OF THE INVENTION

It is, therefore, a primary object of the present invention to provide a photographic display apparatus which presents an image on an orthochromatic, high contrast, graphic arts copy film against a mirrored background so as to present the image with a desired aesthetic effect.

It is another object of the present invention to provide a photographic display apparatus of the type stated in which the orthochromatic film is a positive orthochromatic film and sandwiched between a mirrored substrate and a transparent sheet so that any desired image can be presented in a form similar to an etched glass.

It is a further object of the present invention to provide a unique method of producing a photographic display apparatus which utilizes the formation of a desired image for display on an orthochromatic, high contrast, graphic arts copy film sheet.

It is an additional object of the present invention to provide a method of the type stated which can effectively use almost any type of photograph, whether in the form of a positive print or negative film.

It is another salient object of the present invention to provide a photographic display apparatus of the type stated in which many desired effects can be created by properly choosing the type of orthochromatic film which is used.

With the above and other objects in view, my invention resides in the novel features of form, construction, arrangement and combination of parts presently described and pointed out in the claims.

SUMMARY OF THE DISCLOSURE

This invention relates to photographic display apparatus of the type which presents a visual image similar to that formed on etched glass.

The photographic display apparatus of the present invention includes a substrate, as for example, a glass sheet, which contains a mirrored surface thereon. In addition, an orthochromatic, high contrast, graphic arts copy film, or so-called "ortho film", or "ortho film sheet", is disposed in incidental relationship to the substrate, and preferably in contact with a flat surface of the substrate. The ortho-film will have a visual image thereon of the type desired to be displayed.

Thereafter, a transparent sheet is located in incidental relationship to the opposite surface of the ortho film sheet, and preferably in contact with the opposite surface of this ortho-film sheet. In this way, the ortho film sheet is sandwiched between the transparent sheet and the substrate so that when one views the image on the ortho film sheet through the transparent sheet, it will be viewed against the mirrored surface of the substrate.

Any conventional means for holding the substrate and the transparent sheet against the opposite flat surfaces of the ortho film sheet may be employed, as for example, adhesives, frame means, or the like.

The ortho film may actually contain a negative image, although in the preferred aspect the image should be in a positive form. Moreover, the substrate and the transparent sheets should preferably be rigid members. In this respect, the transparent sheet, and for that matter, the substrate, may be formed of glass or plastic material.

In a typical ortho film, the image will be presented on the ortho film as indicated, and preferably in positive format. In addition, a portion of the ortho film will at least be somewhat transparent, and preferably completely transparent, so that the image presents itself more in an outline form. Otherwise, a portion of the film can be translucent.

The present invention provides a unique method of producing the apparatus of the present invention. In this case, the positive ortho film can be made from either an existing positive print or otherwise a negative film. In order to start from an existing scene for which no photograph or negative therefor exists, a camera would be used to take the picture of an object to be presented and which would initially produce a negative of the scene or object through conventional dark room techniques. This negative is, in turn, printed on positive photographic paper in order to produce a positive print of the image.

If a negative of a desired scene or object for presentation onto a positive photographic print is available, another negative can be generated from the positive print by conventional photographic techniques. Thereafter, and notwithstanding the origin of the negative, this negative is printed onto a positive ortho film. In addition, the ortho film print can be enlarged when printed or otherwise reduced in size. Typical darkroom procedures, as for example, cropping procedures, "touch-up" and the like, may also be employed in order to obtain a positive ortho film copy with the desired effect.

By utilizing the correct type of ortho film, the desired visual effect can be regulated. Thus, for example, either grainy or non-grainy ortho films may be employed. In addition, by slightly raising the transparency from the face of the mirrored substrate, it is possible to produce a type of three dimensional effect. The same three dimensional effect can also be achieved by using a relatively thick transparent substrate with a silver coating on the surface of the substrate opposite that surface which is incidental to the ortho film.

This invention possesses many other advantages and has other purposes which may be made more clearly apparent from a consideration of forms in which it may be embodied. These forms are shown in the drawings accompanying and forming part of the present specification. They will now be described in detail, for the purpose of illustrating the general principles of the invention; but it is to be understood that such detailed descriptions are not to be taken in a limiting sense.

BRIEF DESCRIPTION OF THE DRAWINGS

Figure 1:
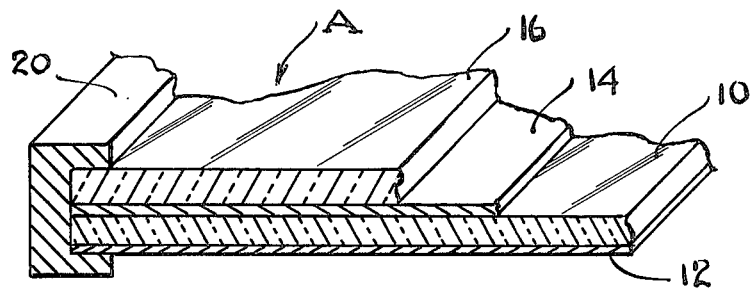
Figure 2:
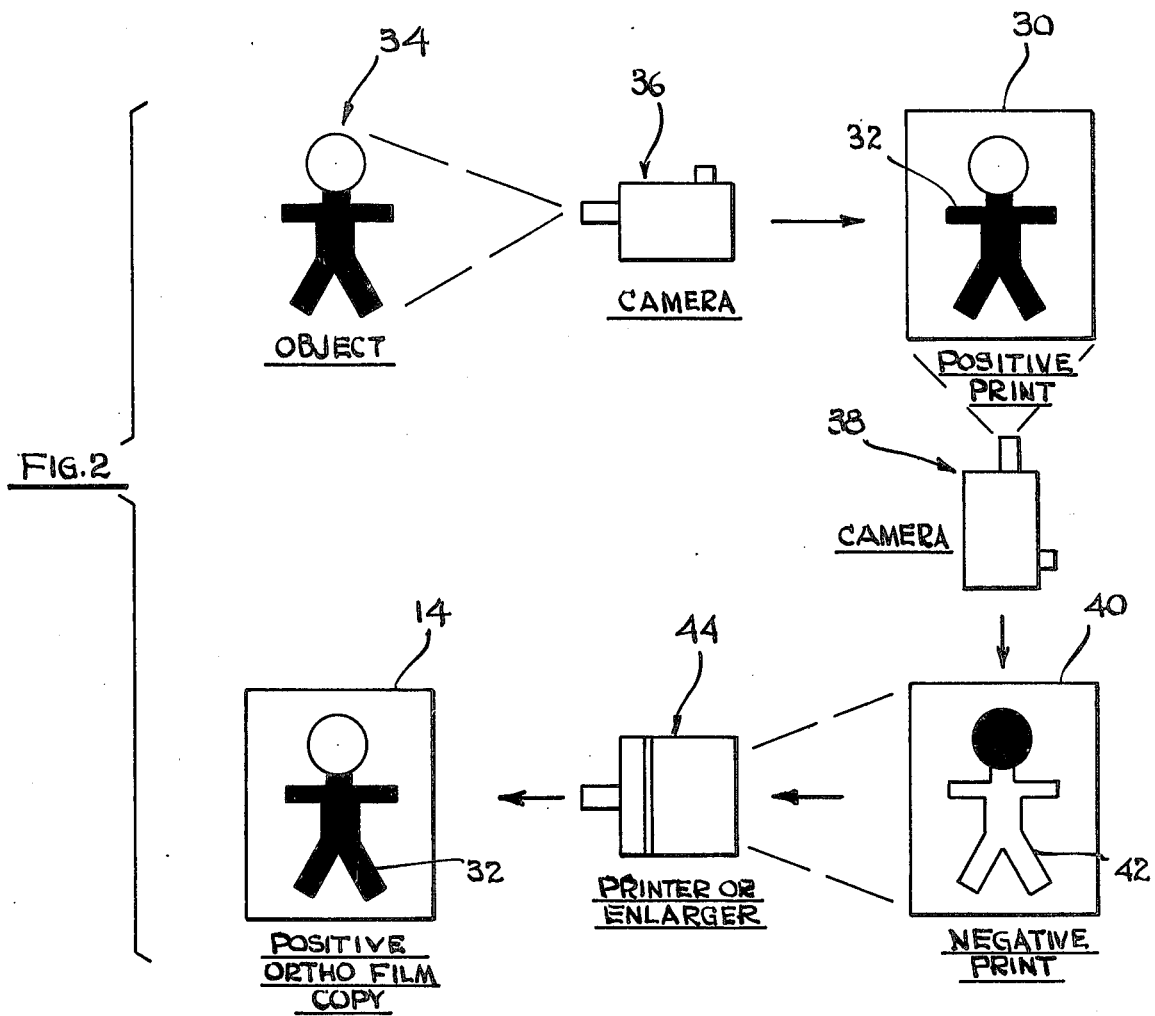

Having thus described the invention in general terms, reference will now be made to the accompanying drawings in which:

FIG. 1 is a vertical sectional view of a photographic display apparatus constructed in accordance with and embodying the present invention; and FIG. 2 is a schematic view showing a series of sequential steps in the producing of a positive ortho film copy forming part of the apparatus of the present invention.

DETAILED DESCRIPTION OF A PREFERRED EMBODIMENT

Referring now in more detail and by reference characters to the drawings which illustrate a preferred embodiment of the present invention, A designates a photographic display apparatus which comprises a substrate 10, and which is preferably transparent. The substrate 10 is provided on one surface thereof, e.g. the lower surface, with a mirrored coating 12. In this respect, any portion of the substrate 10 could be provided with a mirrored coating so that in effect the entire substrate 10 serves as a mirror. In this same respect, if the mirror coating is located on the undersurface, then the substrate 10 should be transparent.

The substrate 10 receives an ortho film 14 on one flat surface thereof, in a manner to be hereinafter described in more detail. The term "substrate" is used in a generic sense and is merely a member to receive and retain the ortho film 14 and present an image on the film against a mirrored background. The substrate 10 should be relatively thin in the cross-sectional dimension when the mirrored surface 12 is located on the undersurface thereof, in the manner as illustrated in FIG. 1.

A transparent sheet 16, e.g., a glass sheet is disposed over the other sheet and preferably is in contact with the ortho sheet 14. A frame 20 may be disposed around the periphery of the sandwiched components as illustrated in FIG. 1.

The ortho film 14 includes an image which is desired for observance, preferably in positive format. The ortho film 14 is that type of film generally used to obtain a "line shot" in lithographic printing, and will generally include an image with a transparent, or at least partially transparent, background.

As indicated previously, the ortho film is a graphic arts copy film, that is a film used in the making of lithographic reproductions and the like. Thus, the term ortho film, as used herein, shall mean an orthographic, high contrast film used in the graphic arts for copy purposes. Films of this type are often used for the making of line and half-tone negatives and positives for photochemical reproduction and for producing half-tone dots for half-tone etching. Some films of this type are the ortho films sold under the trademark "Kodalith" by the Kodak Company.

The process for producing the ortho film 14 is more fully illustrated in FIG. 2 of the drawings. In this case, a suitable photograph, as for example, a photograph 30, may be employed, and which contains an image 32. In the event that a suitable print is not available and the image desired, as for example, an animate character 34 can be photographed, a camera 36 may be used for this purpose in order to produce the positive print 30. In this case, the film in the camera 36 would generally produce a negative film which is, in turn, printed or enlarged if desired, in order to produce the positive print 30. However, the negative could be used to make the ortho film copy hereinafter described.

In the event that no negative is available, another camera would be used in order to generate a negative film of the print 30. In this case, a camera 38 would be used in order to produce a negative 40 and which contains an image 42 of the animate character. It can be observed that on the negative print the head of the image is dark and the body portion is light, whereas compared to the positive print 30, the head is light and the body portion is dark.

The negative 40 may be used to produce the ortho film sheet, as for example, the film 14, by means of a suitable printer or enlarger 44. In this case, a film 14 would include the image 32 in the same form as it is present on the positive print 30. It can again be observed that the ortho film is preferably a positive film such that the body portion of the image 32 is again dark, whereas the head portion is light. Depending upon the effect to be achieved, a negative ortho film could be used so that the image is similar to the image 42 on the negative 40.

The present invention is unique in that it can actually use the original positive produced in a lithographic process, such that the positive need not be discarded. This very positive print can be placed against a background in order to produce an effective visually desirable appearance. Moreover, the photographic display apparatus of the present invention also provides the effect of a mirror etching, although it can be produced in a relatively simple and straightforward photographic process.

As indicated previously, by selecting the proper film, it is possible to produce the desired image in the apparatus A. In this case, it could be possible to select an ortho film which would have a high grain content or a light grain content. Moreover, it is possible to produce the desired effect by over or under exposing the ortho film copy during the printing stage with the printer or enlarger 44.

By slightly elevating the ortho film 14 from the mirrored surface 12, it is possible to produce a type of three dimensional or so-called "3-D" effect. In this case, the 3-D effect can be achieved by merely using a relatively thick substrate 10.

Thus, there has been illustrated and described a unique and novel photographic display apparatus and method of making same and which permits an image on an ortho film displayed against a mirrored background and which, therefore, fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by letters patent is:

1. A photographic display apparatus presenting an effect similar to etched glass, said display apparatus comprising:
   (a) a substrate having a mirrored surface thereon,
   (b) an orthochromatic high contrast graphic arts copy film sheet of the type used in making line reproductions in lithographic processes, said film sheet having a visual image thereon incidental to a surface of said substrate,
   (c) a transparent sheet incidental to said ortho film sheet such that the film sheet is disposed between said substrate and transparent sheet so that one may view the image on said film sheet through said transparent sheet against said mirrored surface, and
   (d) means to hold said substrate and transparent sheet in incidental relationship to said film sheet.

2. The photographic display apparatus of claim 1 further characterized in that said image on said film sheet is a positive image, 3. The photographic display apparatus of claim 2 further characterized in that said substrate and transparent sheet are held in facewise contact with opposite flat surfaces of said film sheet.

4. The photographic display apparatus of claim 3 further characterized in that said substrate and transparent sheet are relatively rigid members.

5. The photographic display apparatus of claim 3 further characterized in that said substrate and transparent sheet are relatively rigid members, and said transparent sheet is glass and said substrate is glass with a mirror surface thereon.

6. The photographic display apparatus of claim 2 further characterized in that a portion of said film sheet is at least somewhat transparent.

7. A method of making a photographic display apparatus presenting an effect similar to etched glass, said method comprising:
   (a) generating a film containing a desired image to be displayed,
   (b) generating a print of said image on an orthochromatic high contrast graphic arts copy film and where a portion of said film is at least somewhat transparent, said film being of the type used in making line reproductions in lithographic processes, and
   (c) enclosing said film between a transparent sheet and a mirrored substrate so that one may view the image on the film through the transparent sheet against the mirrored substrate.

8. The method of claim 7 further characterized in that the film containing the image to be displayed is a negative film and the print is a positive print.

9. The method of claim 8 further characterized in that the step of generating a film containing a desired image comprises exposing a negative to a positive print of the image to be displayed and processing said negative to generate said film.

10. The method of claim 8 further characterized in that said method comprises selecting a film for generation of the positive print thereon with film characteristics to produce a desired aesthetic appearance.

11. The method of claim 8 further characterized in that said method comprises placing said substrate and transparent sheet in facewise contact with opposite flat surfaces of said film and securing said substrate and transparent sheet with respect to said film.

12. The method of claim 11 further characterized in that said substrate and transparent sheet are relatively rigid members.

13. The method of claim 11 further characterized in that said substrate and transparent sheet are relatively rigid members and said transparent sheet is glass and said substrate is glass with a mirror surface thereon.

* * * * *